(12) United States Patent
Kato et al.

(10) Patent No.: US 9,469,483 B2
(45) Date of Patent: Oct. 18, 2016

(54) INDUSTRIAL VEHICLE

(71) Applicant: KABUSHIKI KAISHA TOYOTA JIDOSHOKKI, Kariya-shi, Aichi-ken (JP)

(72) Inventors: Norihiko Kato, Kariya (JP); Yukikazu Koide, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/322,325

(22) Filed: Jul. 2, 2014

(65) Prior Publication Data

US 2015/0012129 A1  Jan. 8, 2015

(30) Foreign Application Priority Data

Jul. 5, 2013 (JP) ................ 2013-141660

(51) Int. Cl.
| | |
|---|---|
| *B60K 17/10* | (2006.01) |
| *B65G 43/00* | (2006.01) |
| *B66F 9/22* | (2006.01) |
| *B65G 35/00* | (2006.01) |

(52) U.S. Cl.
CPC .............. *B65G 43/00* (2013.01); *B65G 35/00* (2013.01); *B66F 9/22* (2013.01)

(58) Field of Classification Search
CPC ......... B65G 43/00; B65G 35/00; B66F 9/20; B66F 9/22; B60W 10/06; B60W 30/10; B60W 10/103
USPC ................ 701/1, 50; 187/224; 414/636, 641
See application file for complete search history.

(56) References Cited

U.S. PATENT DOCUMENTS

| | | | | |
|---|---|---|---|---|
| 4,675,827 A | * | 6/1987 | Narita ................ | B60W 30/18 187/224 |

| | | | |
|---|---|---|---|
| 2006/0201147 A1 | | 9/2006 | Nakamura et al. |
| 2008/0190703 A1 | | 8/2008 | Kato et al. |
| 2011/0112712 A1 | * | 5/2011 | Koide ................ B60K 6/46 701/22 |

FOREIGN PATENT DOCUMENTS

| | | |
|---|---|---|
| CN | 1839091 A | 9/2006 |
| EP | 1688620 A1 | 8/2006 |
| EP | 1724235 A1 | 11/2006 |
| GB | 2281884 A | 3/1995 |
| JP | S60-93699 U | 6/1985 |
| JP | 2000-103596 A | 4/2000 |
| JP | 2002-12398 A | 1/2002 |
| JP | 2002-188482 A | 7/2002 |
| JP | 2009-73607 A | 4/2009 |
| JP | 2012-062137 A | 3/2012 |
| WO | 2008/078941 A1 | 7/2008 |

OTHER PUBLICATIONS

Communication dated Nov. 5, 2014 from the European Patent Office in counterpart application No. 14175382.2.
Communication dated Apr. 28, 2015, issued by the Japanese Patent Office in counterpart Japanese application No. 2013-141660, Partial Translation.
Communication dated Jan. 5, 2016 from the Intellectual Property Office of the P.R. China issued in corresponding Application No. 201410312766.3.

\* cited by examiner

*Primary Examiner* — Adam Tissot
(74) *Attorney, Agent, or Firm* — Sughrue Mion, PLLC

(57) ABSTRACT

An industrial vehicle includes an engine, a hydraulic pump, a cargo handling tool, a mast, a first hydraulic actuator, a second hydraulic actuator, an instruction member, a supply oil passage, and a controller. When the mast is being tilted forward, the controller performs revving control that raises the engine speed when detecting that an operation of the instruction member instructs a load operation that applies load to the engine.

7 Claims, 3 Drawing Sheets

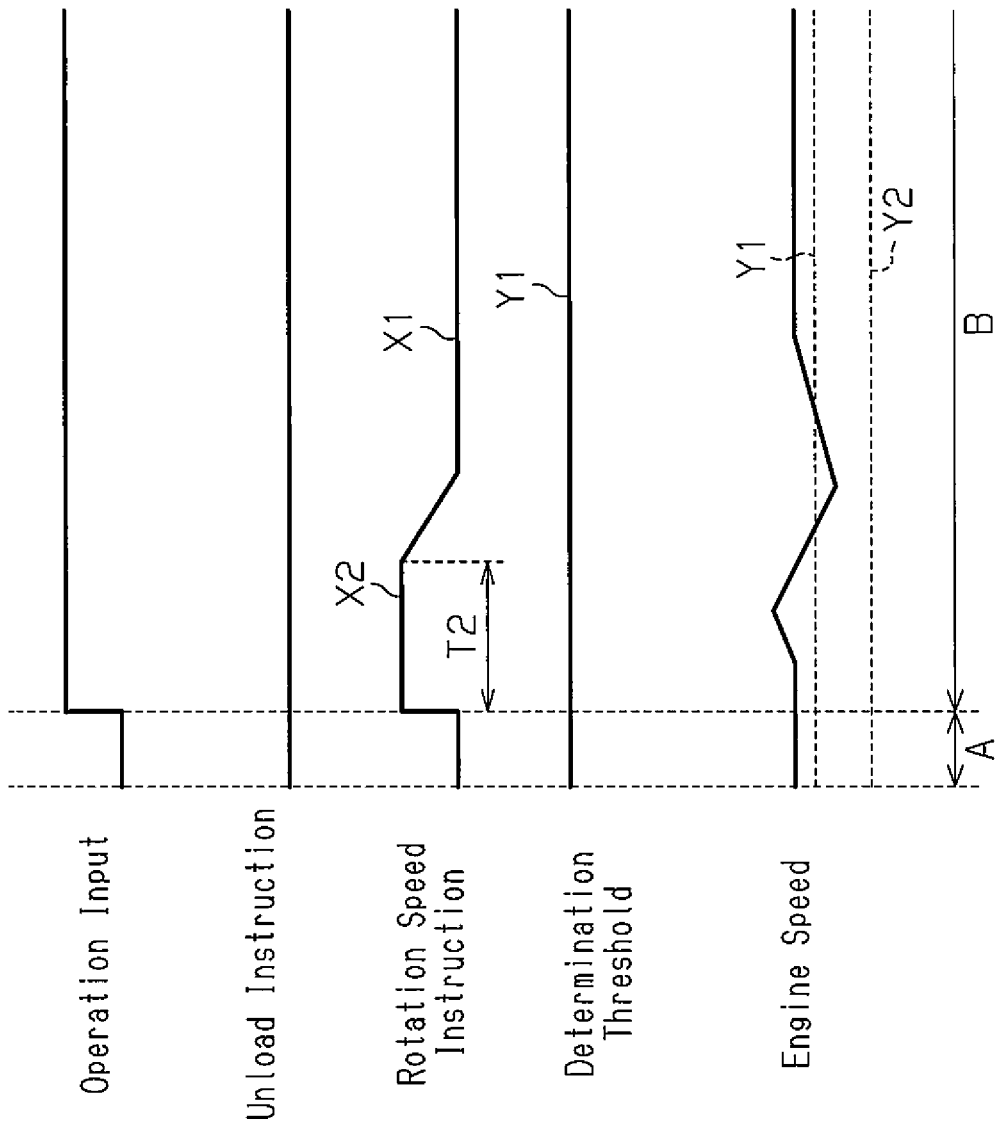

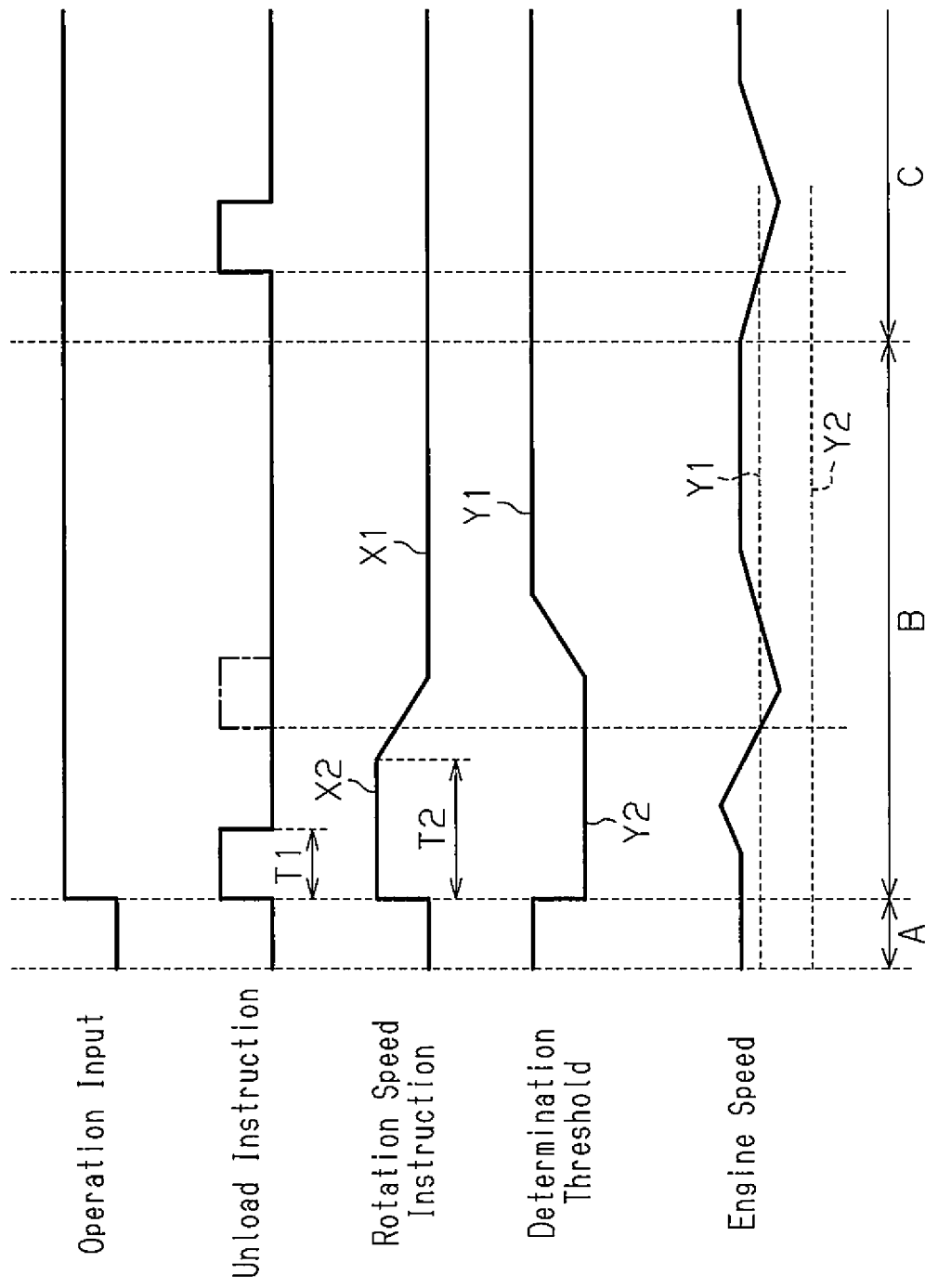

ID VEHICLE

BACKGROUND OF THE INVENTION

The present invention relates to an industrial vehicle that includes a hydraulic actuator, which is driven by hydraulic pressure, and a hydraulic pump, which is driven by an engine to generate hydraulic pressure.

A forklift is one example of a known industrial vehicle that includes an engine, a hydraulic pump driven by the engine, and a hydraulic mechanism, which is configured to operate a hydraulic actuator by hydraulic oil from the hydraulic pump. A forklift includes, for example, a hydraulic lift cylinder, which serves as a hydraulic actuator that lifts and lowers a fork, and a hydraulic tilt cylinder, which serves as a hydraulic actuator that tilts a mast. When driving the hydraulic pump with the engine, an increase in the load applied to the hydraulic pump may result in insufficient engine torque and cause the engine to stall. Japanese Laid-Open Patent Publication No. 2012-62137 describes a structure that prevents such an engine stall. The engine may also stall when a plurality of hydraulic actuators are operated at the same time.

In the above patent publication, a discharge pipe opens when a decrease of the engine speed is detected. This causes the engine speed to further decrease from when the discharge pipe opens to when the load on the hydraulic pump decreases. Thus, an engine stall may still occur.

SUMMARY OF THE INVENTION

It is an object of the present invention to provide an industrial vehicle that obviates engine stalls.

To achieve the above object, one aspect of the present invention is an industrial vehicle including an engine, a hydraulic pump that is driven by the engine and generates hydraulic pressure, a cargo handling tool, a mast to which the cargo handling tool is attached, a plurality of hydraulic actuators driven by the hydraulic pressure, an instruction member that instructs operations of the hydraulic actuators, a supply oil passage that supplies hydraulic oil discharged from the hydraulic pump to the hydraulic actuators, and a controller that controls the engine. The hydraulic actuators include a first hydraulic actuator that lifts and lowers the cargo handling tool and a second hydraulic actuator that tilts the mast. When the mast is being tilted forward, the controller performs revving control that raises the engine speed when detecting that an operation of the instruction member instructs a load operation to be performed that applies load to the engine.

A further aspect of the present invention is an industrial vehicle including an engine, a hydraulic pump that is driven by the engine and generates hydraulic pressure, a cargo handling tool, a mast to which the cargo handling tool is attached, a plurality of hydraulic actuators driven by the hydraulic pressure, an instruction member that instructs operations of the hydraulic actuators, a supply oil passage that supplies hydraulic oil discharged from the hydraulic pump to the hydraulic actuators, and a controller that controls the engine. The hydraulic actuators include a first hydraulic actuator that lifts and lowers the cargo handling tool and a second hydraulic actuator that tilts the mast. When the cargo handling tool is being lowered, the controller performs revving control that raises the engine speed when detecting that an operation of the instruction member instructs a load operation to be performed that applies load to the engine.

BRIEF DESCRIPTION OF THE DRAWINGS

The invention, together with objects and advantages thereof, may best be understood by reference to the following description of the presently preferred embodiments together with the accompanying drawings in which:

FIG. 2 is a timing chart showing the contents of a control executed while tilting a mast of the forklift shown in FIG. 1 forward when another operation is performed; and FIG. 3 is a timing chart showing the contents of a control executed while lowering a fork of the forklift shown in FIG. 1 when another operation is performed.

DETAILED DESCRIPTION OF THE PREFERRED EMBODIMENTS

Figure 1:
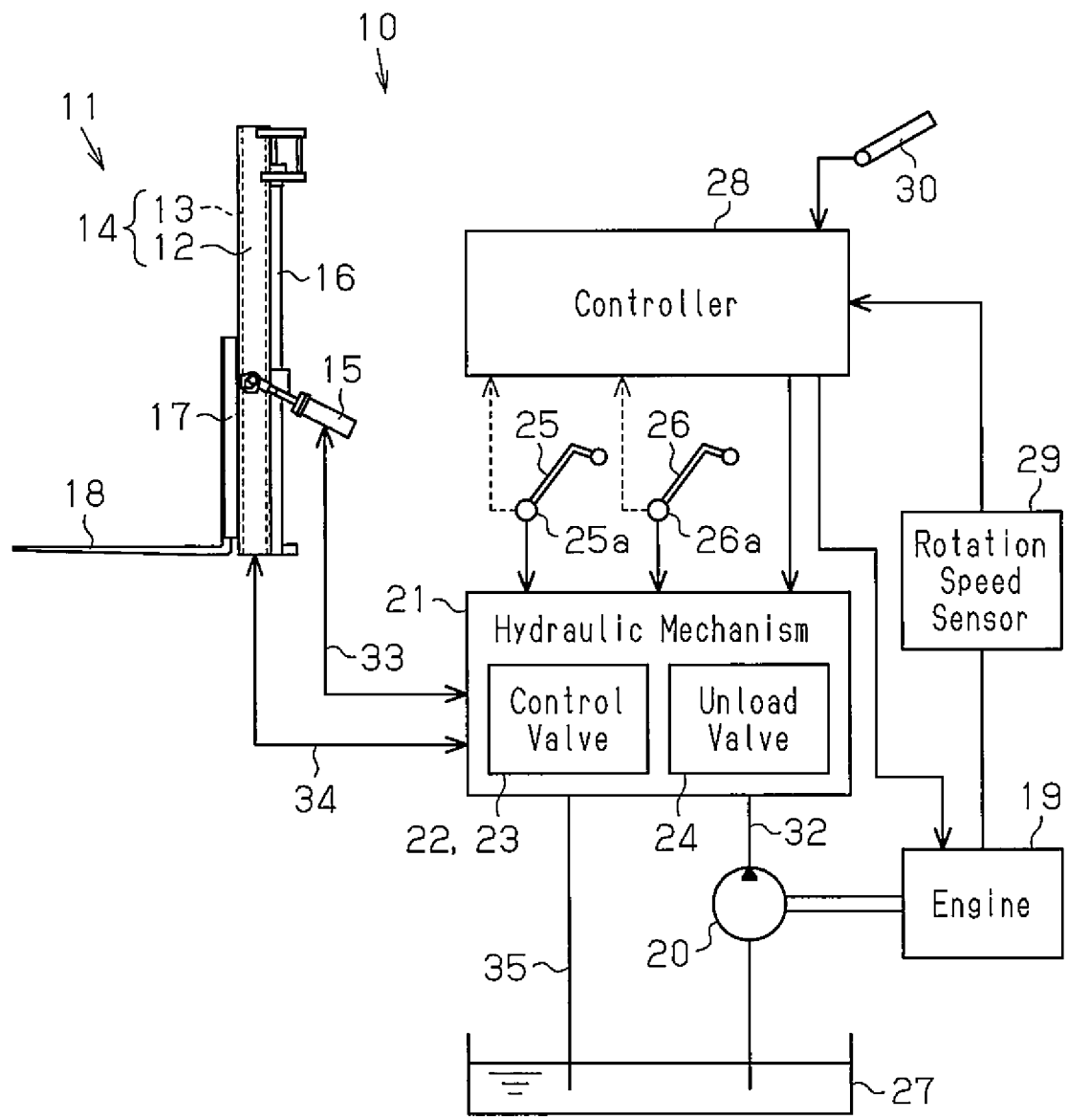
FIG. 1 is a schematic diagram showing the entire structure of a forklift according to one embodiment of the present invention.

One embodiment of an industrial vehicle will now be described with reference to FIGS. 1 to 3.

As shown in FIG. 1, a vehicle body of a forklift 10, which serves as an industrial vehicle, has a cargo handling device 11. The cargo handling device 11 includes a multistage mast 14, which includes right and left outer masts 12 and an inner mast 13. A hydraulic tilt cylinder 15, which serves as a second hydraulic actuator, is attached to each outer mast 12. A hydraulic lift cylinder 16, which serves as a first hydraulic actuator, is attached to the inner mast 13. The mast 14 tilts forward and backward in a front-rear direction with respect to the vehicle body when hydraulic oil is supplied to and discharged from the tilt cylinder 15. The inner mast 13 moves up and down with respect to the vehicle body when hydraulic oil is supplied to and discharged from the lift cylinder 16. Additionally, the inner mast 13 has a fork 18, which serves as a cargo handling tool. A lift bracket 17 is arranged between the fork 18 and the inner mast 13. An operation of the lift cylinder 16 moves the inner mast 13 up and down along the outer masts 12. Thus, the fork 18 moves up and down together with the lift bracket 17.

The vehicle body of the forklift 10 has an engine 19, which is a drive source of the forklift 10 used when driving the forklift 10 and when handling cargoes, a hydraulic pump 20, which is driven by the engine 19 and generates hydraulic pressure, and a hydraulic mechanism 21, which is supplied with hydraulic oil discharged from the hydraulic pump 20. The hydraulic mechanism 21 includes control valves 22 and 23 and an unload valve 24. The control valve 22 controls the hydraulic oil supplied to and discharged from the tilt cylinder 15. A tilt operation member 25, which serves as an instruction member that instructs operation of the tilt cylinder 15, is mechanically connected to the control valve 22. An open-close condition of the control valve 22 is switched by the operation of the tilt operation member 25. The control valve 23 controls the hydraulic oil supplied to and discharged from the lift cylinder 16. A lift operation member 26, which serves as an instruction member that instructs operation of the lift cylinder 16, is mechanically connected to the control valve 23. An open-close condition of the control valve 23 is switched by the operation of the lift operation member 26. The tilt operation member 25 and the lift operation member 26 are arranged in a cabin of the forklift 10 so that an operator can operate the forklift 10. The unload valve 24 controls the discharge of hydraulic oil from the hydraulic pump 20 into an oil tank 27, which is arranged in the vehicle body.

The vehicle body of the forklift 10 has a controller 28. The controller 28 controls the engine speed and an open-close condition of the unload valve 24 based on a detection signal, which is input from a rotation speed sensor 29 that detects the engine speed. A tilt detection sensor 25a, which detects the operation condition of the tilt operation member 25, and a lift detection sensor 26a, which detects the operation condition of the lift operation member 26, are electrically connected to the controller 28. Additionally, the controller 28 detects a depression amount (accelerator position) of an acceleration member 30 (accelerator pedal), which is operated by the operator to accelerate the forklift 10 when driving the forklift 10. Then, the controller 28 controls the engine speed based on the depression amount of the acceleration member 30.

In the present embodiment, the hydraulic pump 20 is driven to draw hydraulic oil from the oil tank 27 and discharge the hydraulic oil. The flow of the hydraulic oil will now be described.

When the unload valve 24 is in a first position, hydraulic oil flows through an oil passage 32, which is connected to the hydraulic pump 20, into the control valves 22 and 23. Then, the hydraulic oil flows through oil passages 33 and 34, which are connected to the control valves 22 and 23, to oil chambers of the tilt cylinder 15 and the lift cylinder 16. For example, when the tilt operation member 25 is being operated, hydraulic oil discharged from the hydraulic pump 20 is supplied to the oil chamber of the tilt cylinder 15 through the oil passage 33, which is connected to the control valve 22. Hydraulic oil, which is discharged from each oil chamber of the tilt cylinder 15 and the lift cylinder 16, is discharged into the oil tank 27 through the oil passage 35 that is connected to the control valves 22 and 23. When the unload valve 24 is in a second position, hydraulic oil does not flow into the control valves 22 and 23 but flows into the oil passage 32 and returns to the oil tank 27 through the oil passage 35, which is connected to the unload valve 24.

The operation of the forklift 10 in the present embodiment will now be described.

First, a control operation of the controller 28 when an instruction to lift the fork 18 or tilt the mast 14 backward is received when the mast 14 is being tilted forward will be described.

When the mast 14 tilts forward, the load on the hydraulic pump 20 is small due to the weight of the mast 14 or the weight of the handled cargo. Thus, when an instruction to lift the fork 18 or tilt the mast 14 backward is received when the mast 14 is being tilted forward, the load on the hydraulic pump 20 increases due to the activation of the hydraulic actuator that performs the instructed operation. When the increased load on the hydraulic pump 20 causes the torque of the engine 19 to become insufficient, the engine may stall. Therefore, under a situation in which the load on the engine 19 may suddenly change, the controller 28 performs an operation that avoids engine stalling. When the mast 14 is being tilted forward, the lifting of the fork 18 and backward tilting of the mast 14 are load operations that apply load to the engine 19.

When the mast 14 is being tilted forward and an instruction to tilt the mast 14 backward is received, the mast 14 shifts from a forward operation to a backward operation. When the mast 14 is being tilted forward and an instruction to lift the fork 18 is received, operations for tilting the mast 14 forward and lifting the fork 18 are concurrently performed as the mast 14 continues to tilt forward.

In period A, shown in FIG. 2, the engine 19 is driven based on a rotation speed instruction X1 (corresponding to an idling engine speed) from the controller 28.

In period B, shown in FIG. 2, when the mast 14 is being tilted forward and an instruction is received to lift the fork 18 or tilt the mast 14 backward, the controller 28 performs revving control to increase the engine speed. Specifically, the controller 28 outputs a rotation speed instruction X2 that instructs a higher rotation speed than that of the rotation speed instruction X1 to increase the engine speed. In this manner, the revving control increases the engine speed. The controller 28 outputs the rotation speed instruction X2 over time T2.

In the present embodiment, the revving control decreases the load on the hydraulic pump 20 and resolves insufficient torque of the engine 19, which would be caused by increased load on the hydraulic pump 20. This obviates engine stalling in the forklift 10 of the present embodiment.

An "unload instruction" shown in FIG. 2 arranges the unload valve 24 at the second position and opens a return oil passage, through which hydraulic oil discharged from the hydraulic pump 20 returns to the oil tank 27. The controller 28 outputs the unload instruction to the unload valve 24. A "determination threshold (threshold Y1)" shown in FIG. 2 is compared with the engine speed to determine whether or not to open the return oil passage when receiving the unload instruction.

In contrast, if an instruction to lower the fork 18 is received when the mast 14 is being tilted forward, the controller 28 does not perform the revving control on the engine 19 and does not output an unload instruction. When lowering the fork 18, in the same manner as when the mast 14 is being tilted forward, the load on the hydraulic pump 20 is small due to the weight of the fork 18 or the weight of the handled cargo. Therefore, when the operations of tilting the mast 14 and lowering the fork 18 are concurrently performed, the load on the hydraulic pump 20 is small, there are no sudden changes in the load on the engine 19, and the above control is not performed.

A control operation of the controller 28 when an instruction to lift the fork 18 or tilt the mast 14 forward or backward is received during a lowering operation of the fork 18 will now be described.

When the fork 18 is being lowered and an instruction to lift the fork 18 or tilt the mast 14 forward or backward is received, activation of a hydraulic actuator that performs the instructed operation increases the load on the hydraulic pump 20. When the torque of the engine 19 becomes insufficient due to the increased load of the hydraulic pump 20, the engine may stall. Therefore, under a situation in which the load on the engine 19 may suddenly change, the controller 28 performs an operation to avoid engine stalling. When the fork 18 is being lowered, the lifting of the fork 18 and forward and backward tilting of the mast 14 are load operations that apply load to the engine 19.

In period A, shown in FIG. 3, the engine 19 is driven based on a rotation speed instruction X1 (corresponding to an idling engine speed) from the controller 28.

In period B, shown in FIG. 3, when the fork 18 is being lowered and an instruction is received to lift the fork 18, tilt the mast 14 forward, or tilt the mast 14 backward, the controller 28 arranges the unload valve 24 at the second position and opens the return oil passage. By opening the return oil passage, hydraulic oil does not flow into the control valves 22 and 23 but returns into the oil tank 27. The return oil passage of the present embodiment includes the oil passage 32, the unload valve 24, and the oil passage 35.

The controller 28 outputs an unload instruction that arranges the unload valve 24 at the second position until the engine speed exceeds a certain value or time T1 elapses. Then, when the output of the unload instruction stops, the unload valve 24 returns to the first position. This opens a supply oil passage, through which the hydraulic oil discharged from the hydraulic pump 20 is supplied to the tilt cylinder 15 and the lift cylinder 16. By opening the supply oil passage, the hydraulic oil that flows into the control valves 22 and 23 is supplied to the tilt cylinder 15 and the lift cylinder 16. In the present embodiment, the supply oil passage includes the oil passage 32, the control valves 22 and 23, and the oil passages 33 and 34.

Additionally, in the same manner as described above, the controller 28 performs the revving control on the engine 19. The revving control increases the engine speed. The controller 28 outputs the rotation speed instruction X2 over time T2.

In the present embodiment, the open return oil passage and the revving control decrease the load on the hydraulic pump 20 and resolve insufficient torque of the engine 19, which would be caused by increased load on the hydraulic pump 20. This obviates engine stalling in the forklift 10 of the present embodiment.

In addition to outputting an unload instruction and the rotation speed instruction X2, the controller 28 changes the threshold compared with an engine speed to a second threshold Y2, which is set to a lower rotation speed than the first threshold Y1. Although the engine 19 is controlled to avoid engine stalling as described above, when the output of an unload instruction stops and the supply oil passage opens, the load on the hydraulic pump 20 increases and the engine speed decreases. If the controller 28 were to use only the first threshold Y1 for comparison with the engine speed, an unload instruction may be output again due to the decrease in the engine speed after activation of the hydraulic actuator, as shown in FIG. 3 by the dashed line. Under this situation, the tilt cylinder 15 or the lift cylinder 16, which started operating, would immediately stop operating due to the output of the unload instruction. This would destabilize operation and interrupt cargo handling. Consequently, adjustment of the cargo handling position or the like may be difficult.

However, in the present embodiment, the controller 28 sets the second threshold Y2, which serves as the threshold for when detecting operations of the tilt operation member 25 and the lift operation member 26. This limits the output of a further unload instruction when the engine speed decreases after activation of a hydraulic actuator. Thus, after the tilt cylinder 15 or the lift cylinder 16 starts to operate, immediate operation suspensions are avoided.

Then, the controller 28, which outputs the rotation speed instruction X2 over time T2, ends the revving control. Then, the controller 28 slowly and gradually lowers the value of the rotation speed instruction back to the rotation speed instruction X1. Also, when ending the revving control, the controller 28 gradually raises the threshold, which is compared with the engine speed, back to the first threshold Y1.

In period C, shown in FIG. 3, the tilt operation member 25 or the lift operation member 26 is continuously operated. During period C, when the engine speed becomes lower than the first threshold Y1, the controller 28 outputs an unload instruction. In period C, the tilt operation member 25 or the lift operation member 26 are continuously operated, the engine speed is decreased, and the load on the hydraulic pump 20 is increased. Under this situation, for example, a hydraulic cylinder may reach a stroke end. Thus, since the engine speed becomes lower than the first threshold Y1, the controller 28 outputs an unload instruction to decrease the load on the hydraulic pump 20 and avoid engine stalling.

As described above, a sudden load change may be determined from operation conditions of the tilt operation member 25 and the lift operation member 26. However, a sudden load change that occurs when a hydraulic cylinder reaches a stroke end cannot be determined from operation conditions of the tilt operation member 25 and the lift operation member 26 or the like. Thus, it is difficult to specify timings for the revving control. Consequently, it is difficult to start the revving control of the engine 19 as described above. In the present embodiment, however, the controller 28 includes the first threshold Y1 and the second threshold Y2. Further, after ending the revving control and starting cargo handling, the controller 28 shifts the threshold back to the first threshold Y1 which is set to a higher rotation speed than the second threshold Y2. As a result, an unload instruction is output at an early stage. The first threshold Y1 and the second threshold Y2 are selectively used in accordance with the situation. This avoids engine stalling in accordance with the situation even when an unload instruction is output in response to a decrease in the engine speed.

During an operation other than forward tilting of the mast 14 and lowering of the fork 18, when another operation is instructed, the controller 28 does not perform the controls described above. During an operation other than forward tilting of the mast 14 and lowering of the fork 18, the engine 19 drives the hydraulic pump 20 to reach the instructed operation speed. That is, the throttle of the engine 19 is open, and the engine speed subtly decreases even when another operation is instructed. Under this condition, if the revving control of the engine 19 were to be performed, change in the engine speed would change the operation speed.

In addition, the contents of the control performed by the controller and shown in FIG. 3 may also be applied to period A, which is when none of the acceleration member 30, the tilt operation member 25, and the lift operation member 26 is operated and no load is applied to the hydraulic pump 20. That is, when detecting operation of the tilt operation member 25 or the lift operation member 26, the controller 28 outputs an unload instruction, performs the revving control on the engine 19, and changes the threshold so that engine stalling is avoided.

The present embodiment has the advantages described below.

(1) During forward tilting of the mast 14 or lowering of the fork 18, when another operation is instructed, a control for avoiding engine stalling such as the revving control is performed on the engine 19. This decreases the load on the hydraulic pump 20 and obviates engine stalling.

(2) Also, before the engine speed falls, a control for avoiding engine stalling such as the revving control is performed on the engine 19 based on an operation instruction. This promptly decreases the load on the hydraulic pump 20.

(3) The forklift 10 is a vehicle that frequently switches operations or performs concurrent operations during a cargo handling operation. Thus, the execution of a control that avoids engine stalling realizes a vehicle that improves cargo handling efficiency.

(4) The controller 28, which includes the first threshold Y1 and the second threshold Y2, sets the threshold to the second threshold Y2 when the fork 18 is being lowered and another operation is instructed. This decreases the frequency in which the unload instruction is output, while avoiding engine stalling through the output of the unload instruction and the execution of the revving control. Thus, the operation of the hydraulic actuator is stabilized. More specifically, the tilt cylinder 15, the lift cylinder 16, and the like do not stop operating immediately after they start to operate.

(5) When the revving control ends, the controller 28 sets the threshold back to the threshold Y1. This allows for the controller 28 to output the unload instruction at an early stage if the load on the hydraulic pump 20 suddenly changes when the fork 18 is being lowered and no other instructions are issued. This decreases the load on the hydraulic pump 20 and obviates engine stalling.

(6) For example, as described above, if the controller 28 were to use only the first threshold Y1 as the threshold, the unload instruction may be output more frequently. If the controller 28 were to use only the second threshold Y2 as the threshold, engine stalling may not be avoided under a situation in which timings of the revving control or the like cannot be determined. In the present embodiment, the controller 28 includes the first threshold Y1 and the second threshold Y2, which are selectively used in accordance with the situation. This obviates engine stalling and stabilizes operations of the hydraulic actuator.

(7) The controller 28 gradually increases the threshold back to the first threshold Y1. That is, the threshold slowly shifts to the first threshold Y1. While taking into consideration delayed responses associated with the control, the advantage of setting the second threshold Y2 can be ensured.

It should be apparent to those skilled in the art that the present invention may be embodied in many other specific forms without departing from the spirit or scope of the invention. Particularly, it should be understood that the present invention may be embodied in the following forms.

The embodiment may be applied to the forklift 10 that includes a hydraulic attachment and a hydraulic mechanism (third hydraulic actuator), which moves the attachment. The hydraulic mechanism is, for example, a hydraulic cylinder. One example of the attachment moves sideward, tilts, or rotates the fork 18. An attachment operation lever for instructing an attachment movement is arranged in the cabin. If an instruction to move the attachment is received when the mast 14 is being tilted forward, the controller 28 in the above forklift 10 performs an operation corresponding to the contents of a control shown in FIG. 2 to obviate engine stalling. Also, when an instruction to move the attachment is received when the fork 18 is being lowered, the controller 28 performs an operation corresponding to the contents of a control shown in FIG. 3 to obviate engine stalling. In this structure, the same advantages as those of the present embodiment can be obtained. Movement of the attachment is a load operation.

Each of the control valves 22 and 23 may be an electromagnetic valve, and the controller 28 may control an open-close condition of the valve using a signal. Under this situation, when the tilt operation member 25 and the lift operation member 26 are not operated, hydraulic oil is constantly discharged to the oil tank 27 through the return oil passage. When an operation of the tilt operation member 25 or the lift operation member 26 is detected, the control valves 22 and 23 do not switch supply oil passages for a certain time period, and hydraulic oil is discharged to the oil tank 27 through the return oil passage. After the certain time period elapses, the control valves 22 and 23 are controlled to open the supply oil passage. Under this situation, revving control of the engine 19 and the switching of thresholds are performed. In this structure, the same advantages as those of the present embodiment can be obtained.

The rotation speed instruction may be set back to the rotation speed instruction X1 as time T2 elapses. The threshold may be set back to the first threshold Y1 when the revving control ends.

In the embodiment, when ending the revving control, the controller 28 gradually raises the threshold, which is compared with the engine speed, back to the first threshold Y1. The control for setting the threshold back to the first threshold Y1 may be performed such that the threshold is gradually increased in a linear or stepped manner with respect to time.

The present examples and embodiments are to be considered as illustrative and not restrictive, and the invention is not to be limited to the details given herein, but may be modified within the scope and equivalence of the appended claims.

The invention claimed is:

1. An industrial vehicle comprising:
an engine;
a hydraulic pump driven by the engine, wherein the hydraulic pump generates hydraulic pressure;
a cargo handling tool;
a mast to which the cargo handling tool is attached;
a plurality of hydraulic actuators driven by the hydraulic pressure, wherein the hydraulic actuators include a first hydraulic actuator that lifts and lowers the cargo handling tool and a second hydraulic actuator that tilts the mast;
an instruction member that instructs operations of the hydraulic actuators;
a supply oil passage that supplies hydraulic oil discharged from the hydraulic pump to the hydraulic actuators; and
a controller that controls the engine,
wherein when the mast is being tilted forward, the controller is configured to perform revving control that raises the engine speed to decrease load on the hydraulic pump when detecting that an operation of the instruction member instructs a load operation that applies load to the engine, and
the controller is configured to perform the revving control prior to a decrease in the engine speed due to the load operation.

2. The industrial vehicle according to claim 1, wherein the load operation is one of lifting of the cargo handling tool and backward tilting of the mast.

3. An industrial vehicle comprising:
an engine;
a hydraulic pump driven by the engine, wherein the hydraulic pump generates hydraulic pressure;
a cargo handling tool;
a mast to which the cargo handling tool is attached;
a plurality of hydraulic actuators driven by the hydraulic pressure, wherein the hydraulic actuators include a first hydraulic actuator that lifts and lowers the cargo handling tool and a second hydraulic actuator that tilts the mast;
an instruction member that instructs operations of the hydraulic actuators;
a supply oil passage that supplies hydraulic oil discharged from the hydraulic pump to the hydraulic actuators; and
a controller that controls the engine,
wherein when the cargo handling tool is being lowered, the controller performs revving control that raises the engine speed when detecting that an operation of the instruction member instructs a load operation that applies load to the engine.

4. The industrial vehicle according to claim 3, further comprising:
   an attachment that moves the cargo handling tool; and
   a third hydraulic actuator that moves the attachment, wherein
   the load operation when the cargo handling tool is being lowered is one of lifting of the cargo handling tool, forward tilting of the mast, backward tilting of the mast, and a movement of the attachment.

5. The industrial vehicle according to claim 3, further comprising:
   an oil tank; and
   a return oil passage that returns hydraulic oil discharged from the hydraulic pump to the oil tank, wherein
   the controller is configured to compare an engine speed with a predetermined threshold and send hydraulic oil to the return oil passage when the engine speed is lower than the threshold,
   the threshold is switched between a first threshold and a second threshold, which is set at a lower engine speed than the first threshold, and
   the controller is configured to, upon receipt of an instruction to perform the load operation when the cargo handling tool is being lowered, send hydraulic oil to the return oil passage, perform the revving control, and switch the threshold to the second threshold.

6. The industrial vehicle according to claim 5, wherein the controller returns the threshold to the first threshold when the revving control ends.

7. The industrial vehicle according to claim 1, further comprising:
   an attachment that moves the cargo handling tool; and
   a third hydraulic actuator that moves the attachment, wherein the load operation is movement of the attachment.

* * * * *